March 20, 1934. J. R. GAMMETER 1,951,402
DIPPED RUBBER ARTICLE AND METHOD OF MAKING SAME
Filed Aug. 5, 1931 2 Sheets-Sheet 2
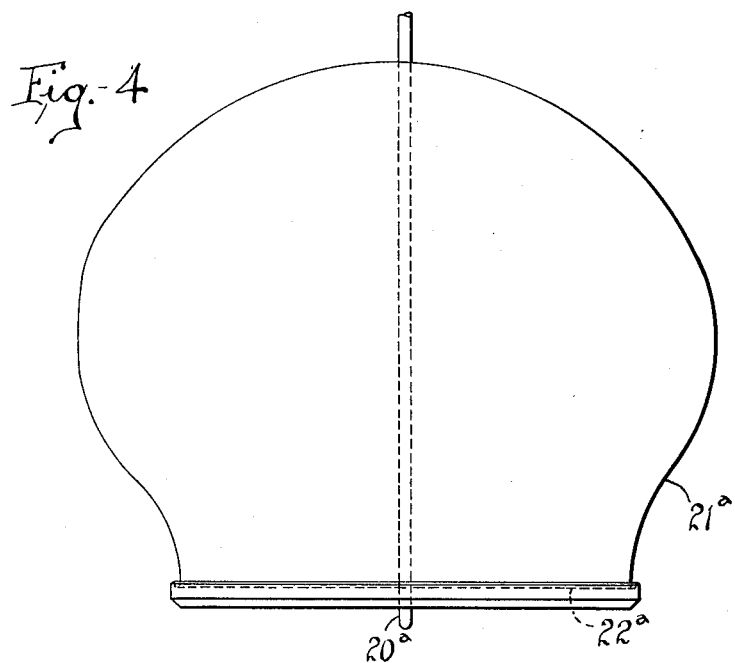
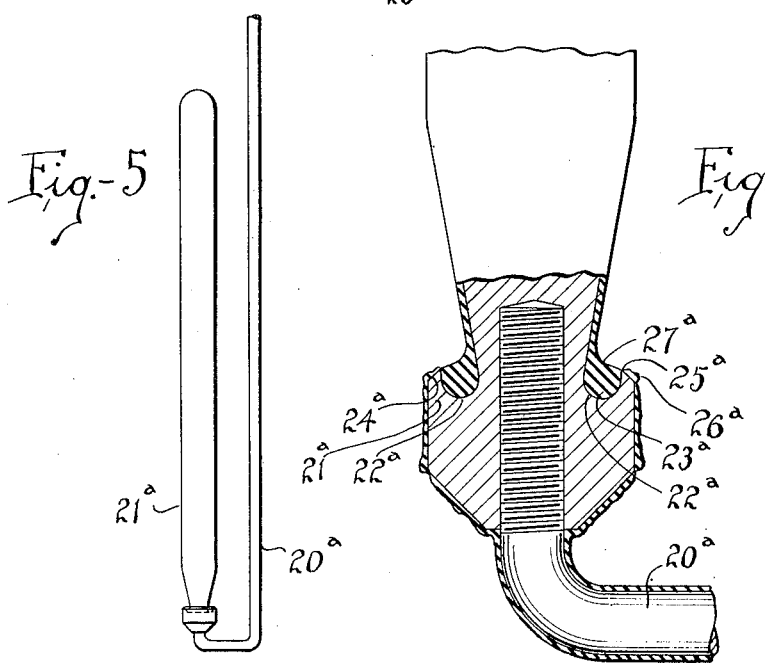
INVENTOR
JOHN R. GAMMETER
BY
ATTORNEYS Patented Mar. 20, 1934

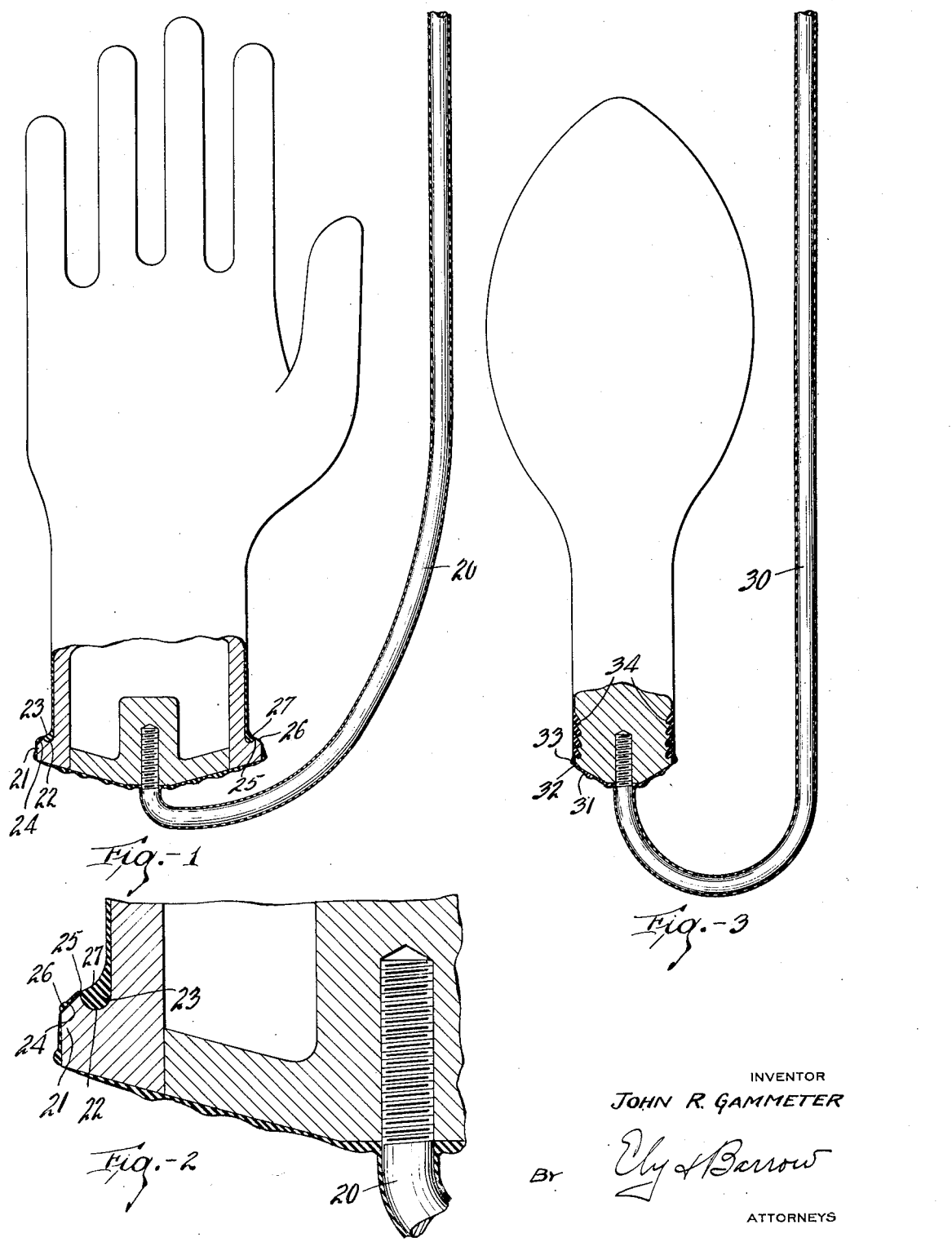

1,951,402

UNITED STATES PATENT OFFICE 1,951,402

DIPPED RUBBER ARTICLE AND METHOD OF MAKING SAME

John R. Gammeter, Akron, Ohio, assignor to Revere Rubber Company, Providence, R. I., a corporation of Rhode Island Application August 5, 1931, Serial No. 555,245

3 Claims. (Cl. 18—41)

This invention relates to dipped or deposited rubber articles such as gloves, balloons, bathing caps, etc., and to procedure and equipment for making the same.

Heretofore, in the manufacture of dipped or deposited rubber goods the provision of a bead or reinforcement thereon has required a separate operation comprising rolling the rubber upon itself from an edge thereof and where the bead must be formed on the lower portion of a form it has been required that the reinforcement be separately applied to the goods as by application of a tape or strip of rubber to the form.

The purpose of the present invention is to provide a dipped or deposited rubber article, a process for making the same and apparatus for carrying out the process whereby the article is provided with reinforcing ribs or beads formed thereon during the dipping or depositing process.

This purpose is attained in the articles and by the process and use of the equipment illustrated in the accompanying drawings and described below. It is to be understood that the invention is not limited to the specific form thereof illustrated and described.

Of the accompanying drawings;

Figure 1 is an elevation, partly in section, of a glove form showing rubber deposited thereon in accordance with the invention;

Figure 2 is an enlarged view of the lower left portion of Figure 1;

Figure 3 is a view similar to Figure 1 of a balloon form showing rubber deposited thereon in accordance with the invention;

Figure 4 is a side elevation of a bathing cap form embodying and adapted to carry out the invention;

Figure 5 is an edge elevation thereof; and

Figure 6 is an enlarged fragmentary section illustrating the manner in which a bead is formed on the bathing cap during the dipping operation.

Referring to the drawings, the numeral 20 designates a suitable support on which is mounted a glove form 21 whereby said form may be dipped with the hand up into a body of rubber-containing-fluid such as liquid latex either vulcanized or unvulcanized and containing any desired vulcanizing reagents, pigments and other compounding ingredients, accelerations, etc.

At the lower portion of the form, the form is extended to provide a grooved shoulder 22 into the groove of which latex collects at 23 during the dipping operations to form a bead, the shoulder being beveled as at 24 to provide a sharp edge 25 at the outer side of the groove.

This form is dipped one or more times in the latex body with drying after each dipping to produce a film of rubber of the desired thickness thereon and during the dipping process the rubber 23 flows into the groove 22 and forms a fillet 27 extending to the edge 25 of the groove. On the beveled portion 24 the rubber gathers away from edge 25, leaving a quite thin deposit adjacent said edge and collecting at 26.

After the form has been dipped and dried in the manner stated, the goods are vulcanized on the forms as by immersion in hot water or subjection to moist steam for the required vulcanizing period. Thereafter, the goods are stripped from the forms, the bead 23 formed by the rubber in groove 22 easily tearing away or being slit from the rubber deposited on the form below the edge 25.

In Figure 3, a hollow form is shown which is somewhat similarly constructed and somewhat similarly used. A plurality of grooves 34 are provided to form several reinforcing rings about the mouth of the balloon, the sharp edge at 32 causing rubber to collect as at 33 above said edge and the bevel 31 causing the rubber to be thinly deposited beneath said edge, whereby after vulcanization the balloon may be stripped from the form, the rubber tearing away or being slit beneath the heavy portion 33.

In Figures 4, 5 and 6, a form is shown which is similar to the form shown in Figure 1, but designed to make bathing caps. The corresponding parts of Figures 4, 5 and 6 are numbered in the drawings with numerals corresponding to those applied to Figures 1 and 2 with the added exponent "a".

Modifications of the invention may be resorted to without departing from the spirit thereof or the scope of the appended claims.

What is claimed is:

1. A form for making deposited rubber articles, said form having an extension about its lower end formed with a bead molding groove in its upper surface, the form having a sharp edge provided about the outer side of said groove, and being beveled outwardly from said sharp edge.

2. A form for making deposited rubber articles, said form having an extension about its lower end formed with a bead molding groove in its upper surface, the form having a sharp edge provided about the outer side of said groove.

3. A form for making deposited rubber articles, said form having an extension about its lower end formed with a bead molding groove in its upper surface.   JOHN R. GAMMETER.